Oct. 8, 1935.    J. T. McDOWELL ET AL    2,016,608
METHOD AND MEANS FOR STORING SUGAR
Filed May 21, 1934    3 Sheets-Sheet 2

Inventors
James T. McDowell
Herman L. Hartburg
George W. Rienks
and Joseph Maudru
By
Attorney

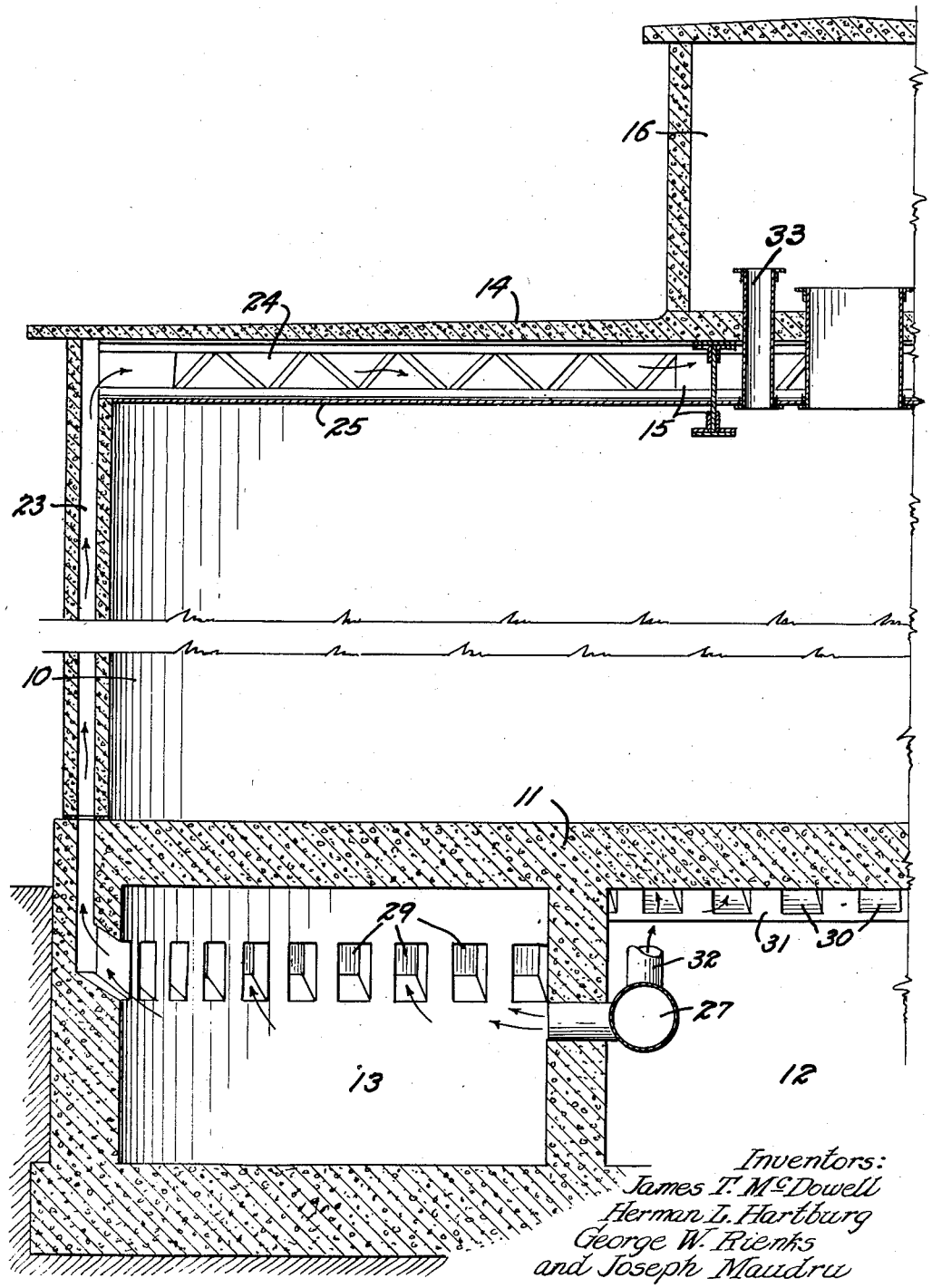

Patented Oct. 8, 1935

2,016,608

UNITED STATES PATENT OFFICE 2,016,608

METHOD AND MEANS FOR STORING SUGAR

James T. McDowell, Herman L. Hartburg, George W. Rienks, and Joseph Maudru, Denver, Colo.

Application May 21, 1934, Serial No. 726,662

7 Claims. (Cl. 98—54)

This invention relates to a method of storing of hydroscopic materials, more particularly sugar, and to a building construction for carrying out said method. The storage of sugar has heretofore been an exceedingly difficult and expensive proceeding. Sugar manufacturing is generally seasonal and must be stored for use during the remainder of the year. At present, the sugar is weighed and bagged after refining and the bags are piled in warehouses for storage. At the time of storage the sugar contains the proper moisture content and each bag is accurate as to weight. After passing through several different seasons and encountering varying atmospheric conditions both as to temperature and humidity, there is a caking or hardening of the sugar rendering it unmarketable and the moisture content of the stored sugar may become sufficiently changed to greatly affect the weight of the bagged sugar so that re-bagging or re-refining will be required.

Bulk storage of sugar presents many other advantages, for instance, it is not necessary to anticipate the number, size or types of bags or containers which may be required since the bagging or sacking can be done when and as ordered. This has never heretofore been possible however, since bulk storage has been impractical.

Attempts have been made to store sugar in metal or wooden tanks or bins. These have not been successful owing to the fact that atmospheric changes, lessens the moisture content of the sugar and causes condensation upon the bin walls which results in caking of the sugar.

The object of this invention is to provide a method and means for storing sugar which will constantly maintain the sugar at its original moisture content point so as to prevent caking, packing, or shrinkage of the sugar.

Another object of the invention is to provide a building construction for the storage of sugar which will carry out the above process and absolutely insulate the sugar from atmospheric changes.

A further object is to provide a building construction for sugar storage which will facilitate the storing and the withdrawal of the sugar from storage.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:—

Fig. 4 is an enlarged fragmentary section taken on the line 4—4, Fig. 2.

Figure 1:
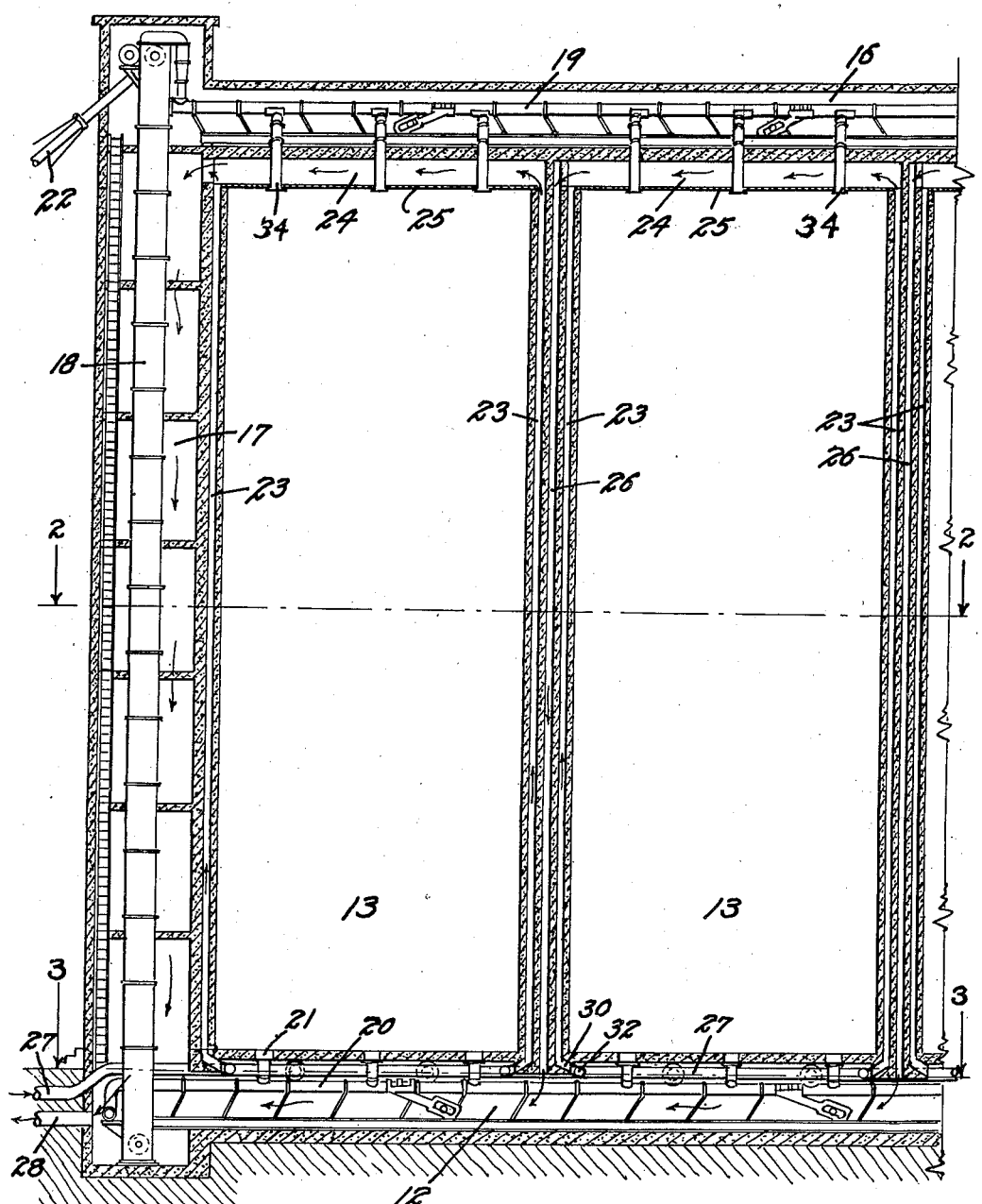
Fig. 1 is a fragmentary, vertical, longitudinal section through what might be termed a sugar elevator or storage plant in which this invention is embodied.
Figure 2:
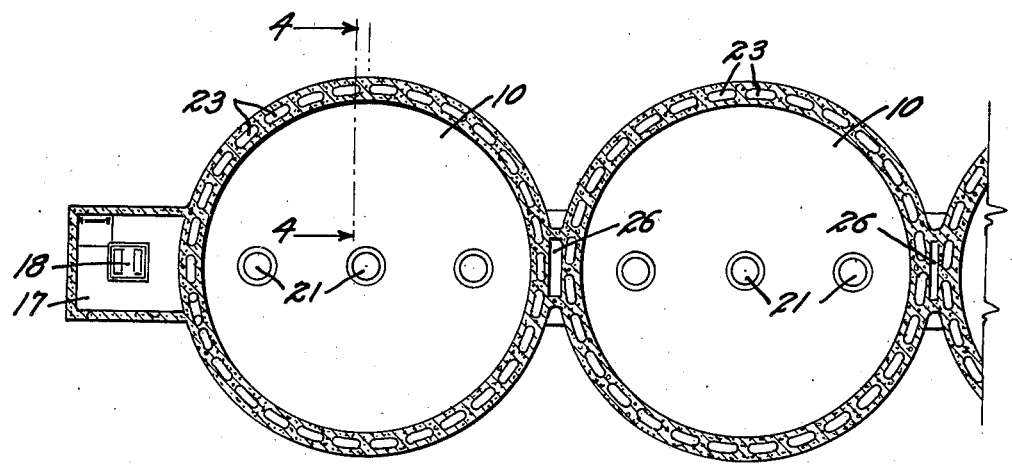
Fig. 2 is a horizontal section therethrough taken on the line 2—2, Fig. 1.
Figure 3:
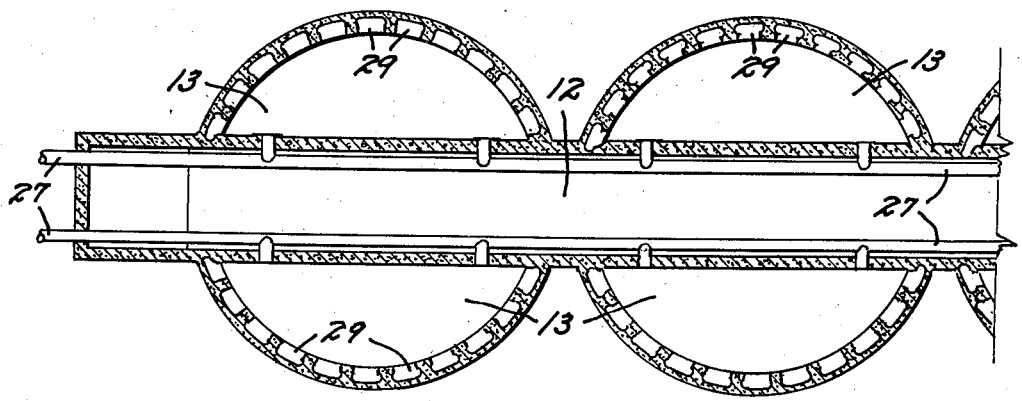
Fig. 3 is a similar horizontal section, taken on the line 3—3, Fig. 1.

Briefly the process embodied in this invention comprises storing the sugar in bulk in a relatively deep bin having relatively thick, air chambered walls which will delay the transmission of external temperature changes. Thence continuously passing air through these walls at a proper temperature to offset external atmospheric temperatures. For instance, should external temperatures drop warmer air will be passed through the walls, and should external temperatures rise, cool air will be passed through the walls so that the temperature on the interior of the bin will be substantially uniform, regardless of exterior conditions.

It has been found that the best construction for carrying out such a process is to form the bins with relatively thick concrete walls having vertical air passages therein. Such a plant is illustrated in the drawings, and comprises a series of vertical cylindrical bins 10 resting upon a basement structure 11. The basement structure 11 is preferably formed in a series of cylindrical portions corresponding to the bins 10. A central work passage 12 extends throughout the length of the basement structure with air chambers 13 at each side thereof beneath each of the bins.

The bins are covered by means of a suitable roof 14 supported upon girders 15. A head house 16 extends throughout the length of the plant upon the roof 14. At one extremity of the series of bins is an elevator shaft 17. The elevator shaft 17 accommodates a suitable elevating conveyor 18 which feeds a filling conveyor 19 in the head house 16. A withdrawing conveyor 20 extends throughout the length of the work passage 12 in the basement structure 11. These conveyors form no part of the present invention, and will be but briefly described here.

To fill the bins, the sugar is elevated on the elevator 18 to the conveyor 19, from whence it is discharged through a series of filling chutes 34 into the bins 10. The sugar is withdrawn from the bins through discharge chutes 21 onto the conveyor 20 which will carry it to any desired point. The conveyor 20 may discharge to the elevator 18, which will carry the sugar to the head thereof, and discharge it through a conveying chute 22 to the bag house or any other desired point.

A series of closely-spaced, vertical air passages 23 are formed in the walls of the bins 10 throughout their entire areas. These passages open at the top to an air chamber 24 over each bin. The air chambers are closed from the bins by means of a false ceiling structure 25. A down passage 26 is formed between each adjacent pair of bins. The down passages 26 open at their bottoms to the work passage 12 and at their tops to the air chamber 24 of one bin of each pair.

The air for the passages 23 is fed into the structure from any suitable air conditioning plant (not shown) through air feed conduits 27 and is withdrawn from the structure through an exhaust conduit 28. The incoming air from the conduits 27 feeds into the air chambers 13 of the basement structure 11 through outlet nipples. From the air chambers the air flows into a series of inlets 29, each communicating with one of the passages 23. It then flows upwardly about the entire circumference of the bins 10 to the top air chambers 24. From the air chambers 24 the air flows into the down passages 26 and discharges into the work passage 12 from whence it is removed by the exhaust conduit 28. The air from the last bin, of the series, that is the one adjacent the elevator shaft 17, flows directly into the elevator shaft and returns to the bottom and to the conduit 28.

It will be noted that certain of the air passages 23 are necessarily positioned over the work passage 12 so they can not communicate with the air chambers 13. These passages may be fed with air in any desired manner. As illustrated, they terminate in inlets 30 in a series of beams 31 which extend across the work passage 12. The air is fed to these inlets by means of auxiliary air pipes 32 from the conduits 27.

It will be noted that by this arrangement, each bin is entirely surrounded by an envelope of constantly moving, constantly conditioned air so that its interior temperature can be accurately controlled by controlling the temperature of this air. In this way, the bin interior is not subjected to temperature changes due to changes in atmospheric conditions.

The structure may be made of any size to suit the requirements of a particular installation. A typical one which is now giving complete satisfaction was constructed with a series of six bins, each having a diameter of 40 feet and a height of 105 feet.

While a specific direction of air flow has been described, this direction could, if desired, be reversed and altered to suit different installations. The particular location of the air conditioner is, of course, not important.

When the bins are being filled, the air therein may be too highly humidified, either from atmospheric conditions or from moisture given up by the incoming sugar or other material being stored. This humid air can be replaced by properly conditioned air forced into the bins under pressure, the humid air escaping through a vent pipe 33 in the top of each bin.

While the invention has been described as particularly adaptable to sugar it will be found useful for any hydroscopic granular material.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. Means for storing bulk sugar comprising: a series of vertical, cylindrical, adjacently-positioned bins formed of concrete, each of said bins having vertically placed air passages through the walls thereof; means for supplying conditioned air to said passages; a false ceiling in each of said bins forming a top air chamber over each bin, each of said top air chambers receiving air from the air passages about that bin; and a down passage between said bins, each down passage receiving air from one of said top air chambers.

2. A building construction for the storage of sugar comprising: a basement structure consisting of a series of interconnected, substantially cylindrical portions; a work passage extending throughout said series; air chambers in each portion at each side of said work passage; a cylindrical bin supported on each of said portions, the walls of said bins having air passages communicating with said air chambers; and means for supplying conditioned air to said air chambers.

3. A building construction for the storage of sugar comprising: a basement structure consisting of a series of interconnected, substantially cylindrical portions; a work passage extending throughout said series; air chambers in each portion at each side of said work passage; a cylindrical bin supported on each of said portions, the walls of said bins having air passages communicating with said air chambers; means for supplying conditioned air to said air chambers; a top air chamber over each bin in communication with said air passages; and a down passage communicating with said latter air chamber and extending downwardly between adjacent bins to said work passage.

4. A building construction for the storage of sugar comprising: a basement structure consisting of a series of interconnected, substantially cylindrical portions; a work passage extending throughout said series; air chambers in each portion at each side of said work passage; a cylindrical bin supported on each of said portions, the walls of said bins having air passages communicating with said air chambers; means for supplying conditioned air to said air chambers; a top air chamber over each bin in communication with said air passages; a down passage communicating with said latter air chamber and extending downwardly between adjacent bins to said work passage; and means for allowing said air to be discharged from said work passage.

5. A building construction for the storage of granular material comprising: a series of vertical cylindrical bins; a bottom in each of said bins; a work passage extending through all of said bins below said bottom; a top over all of said bins; a head house extending over all of said bins above said top; a false ceiling in each of said bins below said top; an elevator shaft connecting said house with said work passage; means in said work passage for withdrawing material from said bins; means in said head house for filling said bins, said latter means operating through the false ceilings of the bins; vertical passages formed in the walls of said bins communicating with the space between said false ceilings and said top; and means for introducing treated air into said passages, there being a passage for the return of said air from above the ceilings of the bin adjacent to said elevator shaft to the latter.

6. A building construction for the storage of sugar comprising: a series of vertical, hollow walled, cylindrical bins; a bottom in each of said bins; a work passage extending across all of said bins below said bottom; a chamber at each side of said work passage in each of said bins, said chambers communicating with hollow interior of the hollow bin walls; and means for supplying conditioned air to said chambers.

7. A building construction for the storage of sugar comprising: a series of vertical, hollow walled, cylindrical bins; a bottom in each of said bins; a work passage extending across all of said bins below said bottom; a chamber at each side of said work passage in each of said bins, said chambers communicating with hollow interior of the hollow bin walls; openings in the inner walls of said bins adjacent the top thereof and communicating with the hollow interior of said walls; a false ceiling in each of said bins below said openings; means for supplying conditioned air to said chambers through said hollow walls; and means for returning said air from above said false ceilings.

JAMES T. McDOWELL.
HERMAN L. HARTBURG.
GEORGE W. RIENKS.
JOSEPH MAUDRU.